INVENTOR.
LYNN ALLEN STAPLES

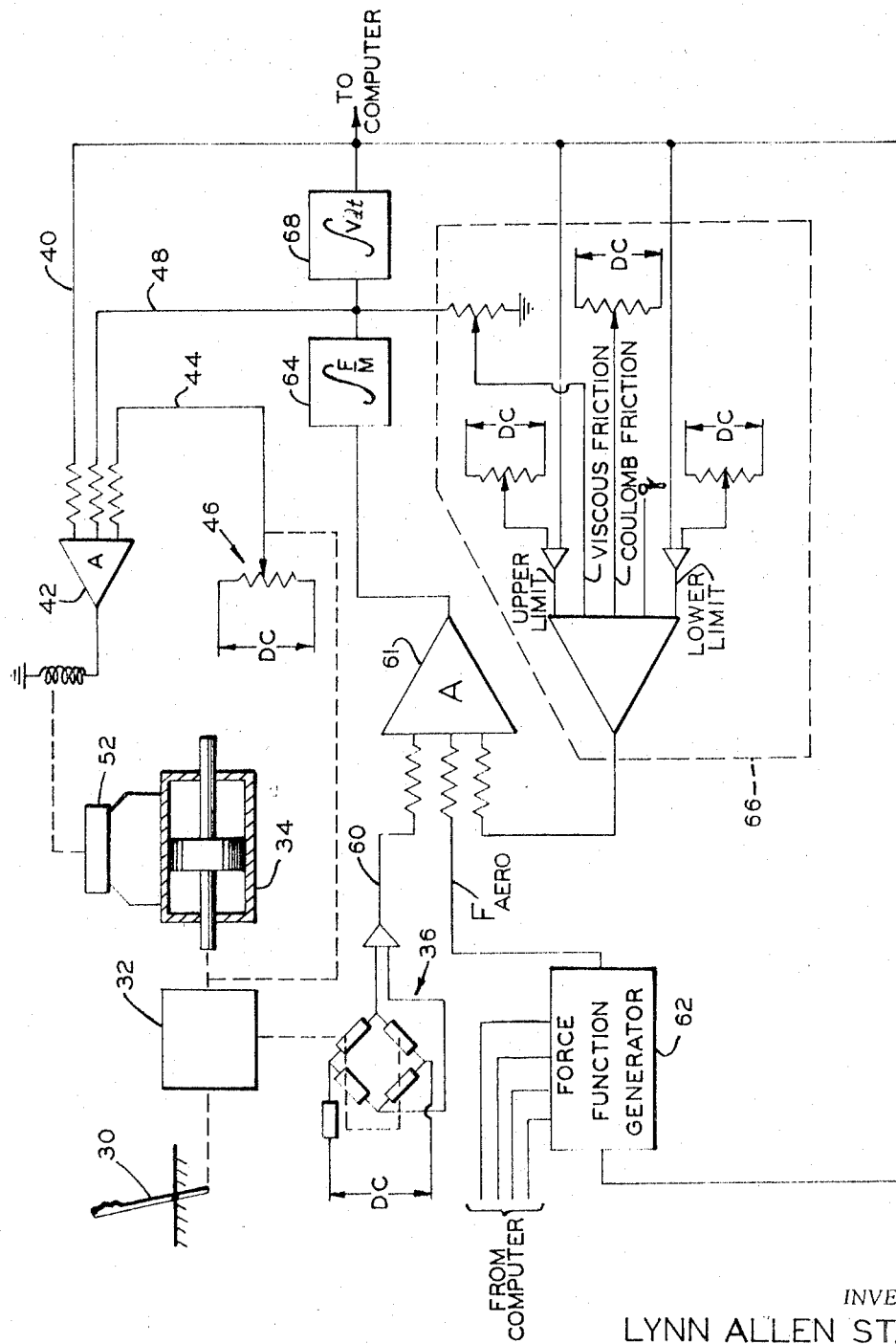
FIG. 1-A

United States Patent Office 3,463,866
Patented Aug. 26, 1969

3,463,866
FLIGHT SIMULATOR CONTROL LOADING SYSTEM
Lynn Allen Staples, Binghamton, N.Y., assignor to Singer-General Precision, Inc., a corporation of Delaware
Filed June 18, 1964, Ser. No. 376,039
Int. Cl. G09b 9/08
U.S. Cl. 35—10.2                                      7 Claims

ABSTRACT OF THE DISCLOSURE

A control loading system for a grounded flight trainer having a servo feedback loop to provide realistic opposition to mechanical input by a student pilot to a flight control member of the trainer wherein a math model simulation of the control member is provided to enable accurate computation of the response of such control member to programmed, simulated flight data as well as to the student pilot's mechanical input before applying a signal representing the response to the servo; that is, the flight control system is simulated with hardware which can accurately compute its reaction and this hardware is slaved to the servo feedback of the trainer.

---

This invention relates to a flight simulator control loading system, and more particularly, to an improved arrangement for imparting realistic reaction forces to the controls of a simulated aircraft, rocket vehicle or the like.

Flight simulators used for the instruction and testing of aircraft operating personnel commonly are provided with control loading systems which impart to simulated controls, such as control sticks and rudder pedals, reaction forces and movements simulating those of the aircraft being simulated. The "feel" of an actual aircraft control at any given instant depends upon a variety of variables, such as control position, the instantaneous dynamic pressure, various aircraft angular rates, the position of trim tabs, the effects of control boost systems, etc. In conventional analog flight simulators of the prior art, voltages or shaft positions proportional to all of the variables affecting a control force have been applied to analog computer elements to derive a "required force" potential. This computed potential has in turn been applied to a force-feedback servo mechanism connected to apply a force to the control commensurate with the computed "required force" potential. Because control position itself affects a variety of flight quantities, and, further, because the force applied to the control by the pilot and reaction forces from the aircraft both affects control position, it will be seen that a complex closed loop exists. Because the analog computer elements employed in computing the "required force" potential involved continuous computation, the "required force" potential, though perhaps varying, was always immediately available for application to the force-feedback servo-mechanism, and the computed potential varied relatively smoothly as some or all of the variables changed, the force felt by the student realistically responded to his motion of the controls because continuous analog computations were used.

Such prior art analog control loading systems have not proved entirely satisfactory, however, because among other things drift introduced in the servo position loop (from leakage through a hydraulic control valve by way of example) appears to the analog computer elements as a false control position input signal which adversely affects the derived "required force" potential.

The more modern flight simulators, employ digital computation, rather than analog computation, because of its increased accuracy and ease of re-programming. In digital flight simulators most, or all, flight quantities are computed in closely spaced steps digitally and successively, and then converted to analog voltages, by means of one or more digital-to-analog converters, to provide analog voltages for operating indicating meters, indicating servomotors, and the like. Thus, each flight quantity in a digital flight simulator computer is represented by a succession of digital numbers, each of which is accurate only for an instant or for the time interval that the corresponding flight quantity is constant. When converted to analog form, successive digital quantities result in an analog voltage which necessarily changes in discrete steps, even though the corresponding time flight quantity is smoothly varying. The large majority of instruments and indicators observable by the student pilot have needles or pointers and the like, and when the stepped analog voltages are applied to such instruments, the resulting stepped displacements are unnoticed by the human eye, when the steps are small. Additionally, most of the flight quantities that are displayed vary at a rate, corresponding to frequencies less than a few cycles per second due to the inertia of the aircraft being simulated, this rate being slow enough to permit the stepped analog voltages to be smoothed or filtered to removed high-frequency components before being applied to their respective indicators.

The student pilot is on the other hand, quite sensitive to shock and vibration in the control forces so that it is highly desirable and generally necessary to provide a better high frequency response in a flight simulator control loading system. Since striking a limit stop, for example, may create an audible knock, there are situations wherein important components for realism in control loading forces are much higher in frequency than those required for the meter needles above mentioned. When a digital computer is substituted for the analog computer system previously employed, the most straight forward and obvious approach, is to compute as digital numbers those quantities heretofore computed in analog form, to convert the digital quantities into analog voltages to operate a conventional control loading force-feedback servo-mechanism, to sense control position and convert the position to a digital number, and to re-enter the digital number in the digital computer. Such a direct approach is not feasible in the present state of the art, however, because the necessary frequency response in the control loading position loop required for realistic simulation is an order of magnitude greater than the frequency response required of the digital computer for the great bulk of simulation computations. The frequency response capability of the digital computer is determined by the frequency of the steps by which each flight quantity is re-computed and updated. The cost and size of the digital computer depends largely upon this frequency. While it is theoretically possible to obtain practically any repetition or recomputation rate by operating digital computers or arithmetic units thereof in parallel, it would be regarded as wholly wasteful and extremely expensive to speed up the entire digital computer solely to meet the frequency response requirements of the control loading.

According to the present invention, however, there is provided an improved flight simulator control loading system which allows the use of a highly accurate digital computer, to eliminate drift problems associated with analog systems and which also has an effective frequency response greater than the frequency response capability of the digital computer employed. Briefly, the novel system employes a continuously operating force feedback servo which accurately represents the input feel of the controls by an analog model of the control input inertia which changes velocity immediately responsive to a sudden input force, while relying on the digital computer to compute accurate steady position values. A servo force loop rather than a servo position loop is implemented to the simulated aircraft data. By implementing the force loop, the contribution of control stick inertia and linkage compliance, for example, is immediately available. Further, by linearly interpolating analog calculated functions of control position with the corresponding various low frequency error signals provided by the digital computer, the frequency response of the force loop can be maintained high, since the control position signal is the only variable self-contained in the closed loop. In this manner, although the force applied to the control may not have exactly the correct value until all the computations have been performed by the digital computer, a change in the force applied to the control immediately applies a signal to the force-feedback servomechanism, without awaiting new quantities to be computed.

Another object of the invention is to provide an improved flight simulator control loading system for imparting realistic forces to the controls of a simulated aircraft, rocket vehicle or other controllable machine.

A further object of the invention is to provide an improved flight simulator control loading system wherein a mathematical model of the aircraft controls is implemented to a servo force loop rather than a servo position loop.

Still another object of the invention is to provide an improved flight simulator control loading system employing a digital computer.

Yet another object of the invention is to provide an improved flight simulator control loading system wherein the drift of the control position introduced by a hydraulic control valve is not introduced into the flight system.

A still further object of the invention is to provide an improved flight simulator control loading system employing a digital computer in which the system has a higher frequency response than the digital computer and is free of noise due to digital computer sequential calculations.

It is another object of the invention to provide a system of the type described which utilizes a minimum amount of conversion equipment, and in which as much of the equipment as possible is common to each of a plurality of control loading systems, so that certain equipment need not be repeated for each different control to which forces are to be applied.

A further important requirement, and a feature of the invention is that digital computer repetition noise arising from the step-type operation does not affect the force signal.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1A is a partly diagrammatic, partly electrical schematic showing one embodiment of the present invention.

Figure 1:
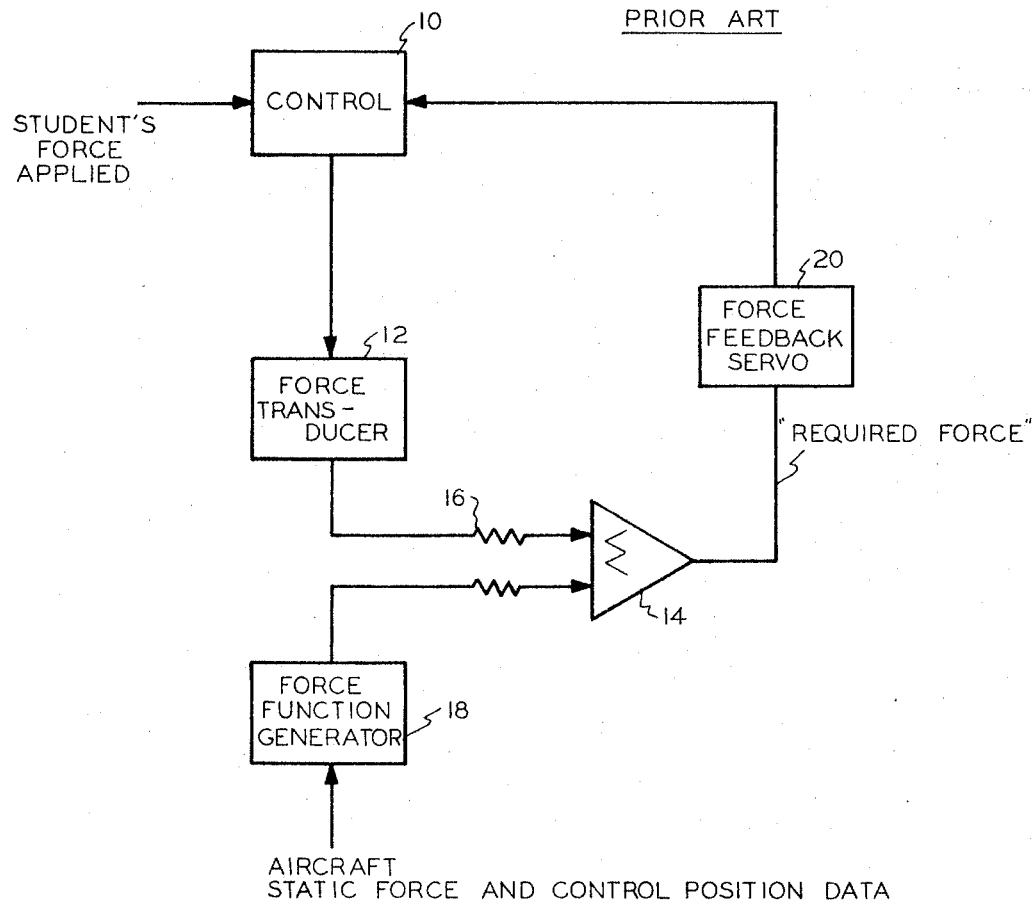
FIG. 1 is a simplified block diagram of a control loading system of the prior art.

Referring now to the drawings, FIG. 1 is a simplified block diagram of a control loading system of the prior art. As there shown, the force applied by a student-trainee to a control 10 is converted to an electrical signal by means of transducer 12 and thereafter applied as one input to a summing amplifier 14 through resistor 16. Another input to summing amplifier 14 is provided by a force function generator 18 which receives a plurality of signals representing various flight quantities, such as the simulated aircraft static force and also control position data, and from these quantities computes a "required force" signal which is compared in amplifier 14 with the "existing force" signal from the transducer 12 and provides an error signal, commensurate with their difference. The error signal considerably amplified by amplifier 14 operates a force-feedback servo 20, to thereby provide to the simulated control the appropriate reaction forces corresponding to the flight conditions movements of the aircraft being simulated. It should be noted that such systems of the prior art, to the extent that a servo position loop is implemented by analog means, have been deficient in that they exhibit relatively poor stability, a relatively low frequency response, as well as drift problems. It is also well known that signals commensurate with measured control velocity and measured control acceleration may be used in computing the "required force" signal provided by the generator 18.

Referring now to FIG. 1A, there is illustrated a control loading system according to the present invention. The student pilot applies a force to a control 30, shown in FIG. 1A by way of example as a stick or control column, which is then transmitted to a reaction device 32 such as a proving ring or conventional strain gauge commonly used in connection with force transducers. This force, which is ultimately opposed by an actuator element 34, such as a reciprocally movable hydraulic cylinder shown in FIG. 1A, is converted to an electrical signal by a transducer such as the conventional bridge circuit associated with the strain gauge and indicated generally by the referenced numeral 36. This signal, rather than being applied directly as an input to the physical servo as in the prior art, is then transmitted to an analog model of the control and forces acting thereon arranged in a second feedback loop having only electronic elements and therefore free of the undesirable attributes of the physical servo feedback loop. The analog model, in a manner more fully explained hereinafter, provides an approximate computed position signal which is returned as an input to the model, thereby forming other input to amplifier 42 is a signal provided along a line 40 to a first input of a summing amplifier 42. Another input ot amplifier 42 is a signal provided along a line 44 which represents the measured actual position of control 30 generated by a position transducer 46. Further, since the analog model is a second order system, as will presently be explained the computed velocity is also applied to amplifier 42 along a line 48. The output of amplifier 42 is then applied to a servo amplifier 50 which controls a hydraulic flow valve 52 coupled to cylinder 34.

The electrical signal from transducer 36, representing the resultant of the control forces physically exerted by the student pilot on control 30 and the reaction forces impressed thereon by actuator 34, is supplied by a line 60 as one input to a summing amplifier 61. An additional input, representing the resultant of external forces affecting the reaction force applied to the control, is supplied by force function generator 62, the operation of which is completely described in connection with FIG. 4. A third signal to amplifier 61 is supplied by an electrical implementation of the frictional forces and physical limits of movement of control 30. One example of such an implementation is shown in FIG. 1A enclosed by a dotted line numbered 66. The upper and lower limits of movement of the control are assumed in this example to be fixed. Therefore, it is necessary only to compare an electrical signal representing the computed position of the control with a fixed reference voltage which may be selectively established by manually adjustable potentiometers, as indicated in the drawing. Since viscous friction is a function of velocity, the electrical signal representing this quantity is supplied from a terminal at which a signal representing the computed velocity is present. Coulomb friction is a constant and may therefore be represented by a fixed reference voltage. In this example, friction is also assumed to be a function of dynamic pressure $q$ which is a programmed flight variable and is therefore supplied as an input to the friction and limit system from the flight computer. Since static friction is present only when the velocity is zero, it is assumed in this example that there is no effect requiring simulation of static friction in the system. Thus, a signal representing acceleration (the summation of the forces divided by the mass of the system) is supplied by amplifier 61 to integrator 64. Although FIG. 1A illustrates amplifier 61 and integrator 64 as two separate elements, they may be combined and shown, for example, as a single operational amplifier. The output of integrator 64 is a signal representing the velocity of the system, which is a computed velocity of the analog model rather than the actual, measured velocity of the control 30. As previously stated, the velocity signal is supplied over line 48 as one of the inputs to the physical servo loop, and is also supplied as an input to a second integrator 68. The integral of velocity provides a signal representing the computed position of control 30 in accordance with values supplied to the analog model thereof. The position signal provides the final input to the physical servo system along line 40 and is also fed back as an input to the analog model. Thus, the model receives three inputs, i.e., a measured force signal, a computed position signal, and one or more signals representing programmed and calculated values of other pertinent variables from an external computer, and provides two outputs, i.e., a computed velocity and a computed position of the control member.

It may now be seen that any drift introduced into the system by flow valve 52 may alter the position of control 30 as in the systems of the prior art, but this drift is not introduced into the analog model and does not effect any of the servo error quantities. The system as shown achieves a markedly increased stability of the control loading servo since the system inertia relating force and velocity in integrator 64 may readily be maintained greater than the minimum value needed to meet the servo force loop stability requirements. Additionally, because of the inherent drift combined with hysteresis loop in flow valve 52, it generally has been impossible to maintain a dependable position signal input according to the simulated flight with the devices of the prior art. In the present invention, however, high loop gains may be utilized in order to balance the preload centering spring equations, thereby resulting in greater ability to return the computed control position to neutral.

In some of the previous simulators, the simulated autopilot could not "fly" the flight computer when the control loading servo was included in the autopilot loop. Therefore, makeshift circuitry has been utilized in order to drive the control servo while the autopilot by-passed the control servo completely in the flight system. However, the frequency response of the present system may be determined easily by simple loop gain changes which are accompanied by the proper lead networks, thereby providing a system in which the autopilot transfer functions may be readily solved. By merely addition an incremental viscous friction force, $-KV$, to each positional force, $-KX$, which contributes to a discontinuous or steep slope in the force function generator, wherein K is a constant, V is velocity, and X is displacement, a very stable system is achieved with attendant realistic damping ratios. It should also be understood that because the servo force loop is closed through the acceleration and velocity block, as will be better understood as the description proceeds, a minimum inertia value, such as by way of example 0.85 slug feet$^2$, must be introduced by setting the gain of the amplifier 61 of the model 38 in order to meet the stability requirements of the system, that is, the frequency response of the force servo loop should not exceed the frequency response of the remaining portions of the system. Evaluation of the present system shows that the total inertia force transmitted to the pilot equals the mechanical inertia in the actual control between the inertia introduced in the model 38. Also, the inertia value student pilot and force transducer 36, plus the simulated transmitted to the student pilot by the implemented model may be further reduced by a mechanical linkage reduction between force transducer 36 and position transducer 46 of the loader servo if desired.

Specifically now, in an actual aircraft, the aerodynamic force F applied to the pilot's control (assuming the absence of a boost system), may be expressed as:

$$F_{aero} = k_{hm} q$$

where:

$F_{aero}$ = the aerodynamic force applied to the control without control function, bob-weight, or sprashpot forces or the like;

$k_{hm}$ = the hinge movement coefficient of the control surface; and $q$ = the instantaneous dynamic pressure which normally is equal to one-half air density multiplied by true air speed squared.

The hinge moment coefficient of the control surface, $k_{hm}$, in the above equation depends upon a number of variables, and it may be written as a basic function $f(x)B$ plus a plurality of incremental or error functions, as, for example:

$$k_{hm} = f_{(x)B} + \Delta f_{(x)M} + \Delta f_{(x)WF} + \Delta f_{(x)TRIM}$$

wherein $(x)$ denotes the position of a particular surface such as an elevator, a rudder, or even the position of the pilot's control in certain instances;

$f_{(x)B}$ = the basic function expressing the variation of hinge moment coefficient with variation in $(x)$;

$\Delta f_{(x)M}$ = an incremental function expressing the perturbation in hinge moment coefficient with $(x)$ being a function of Mach. Number encountered in the simulated flight;

$\Delta f_{(x)WF}$ = an incremental function expressing the perturbation in hinge moment coefficient with $(x)$ as a function of wing flap position; and $\Delta f_{(x)TRIM}$ = an incremental function expressing the perturbation in hinge moment coefficient with $(x)$ as a function of trim control position.

The perturbation functions in the above equation such as $\Delta f_{(x)M}$, $\Delta f_{(x)WF}$, $\Delta f_{(x)TRIM}$ change at a relatively slow rate, and therefore are readily calculated by a conventional digital computer. Further, each of these functions contribute only to the *magnitude* of the $F_{aero}$ potential rather than its phase. A position feedback loop exists around and through force servomechanism 50, entirely external to the digital computer employed and its output quantities. If the student trainee should attempt to jerk control 30 rapidly to a new position, the change in the applied force on the control is *immediately* detected and transmitted via amplifier 61 and integrator 64 to force servomechanism 50 by force sensor 32, and the change in "force required" due to change in computed control position is similarly and *immediately* applied to the force servomechanism, without the necessity of awaiting new quantities to be calculated by the computer. While the step analog voltages provided by the digital to analog converter associated with the digital computer may or may not change when the student trainee effects such an action, and while the exactly correct value of $F_{aero}$ may not be completely calculated until after all the computations have been made in the digital computer, the error meanwhile in the computed value $F_{aero}$ will be seen to be one of *magnitude only* rather than phase, so that the force servomechanism loop will be stable, as well as exhibiting a considerably higher frequency response than that to which other control loading systems have previously been limited by the digital computer computation rate.

Figures 2, 3:
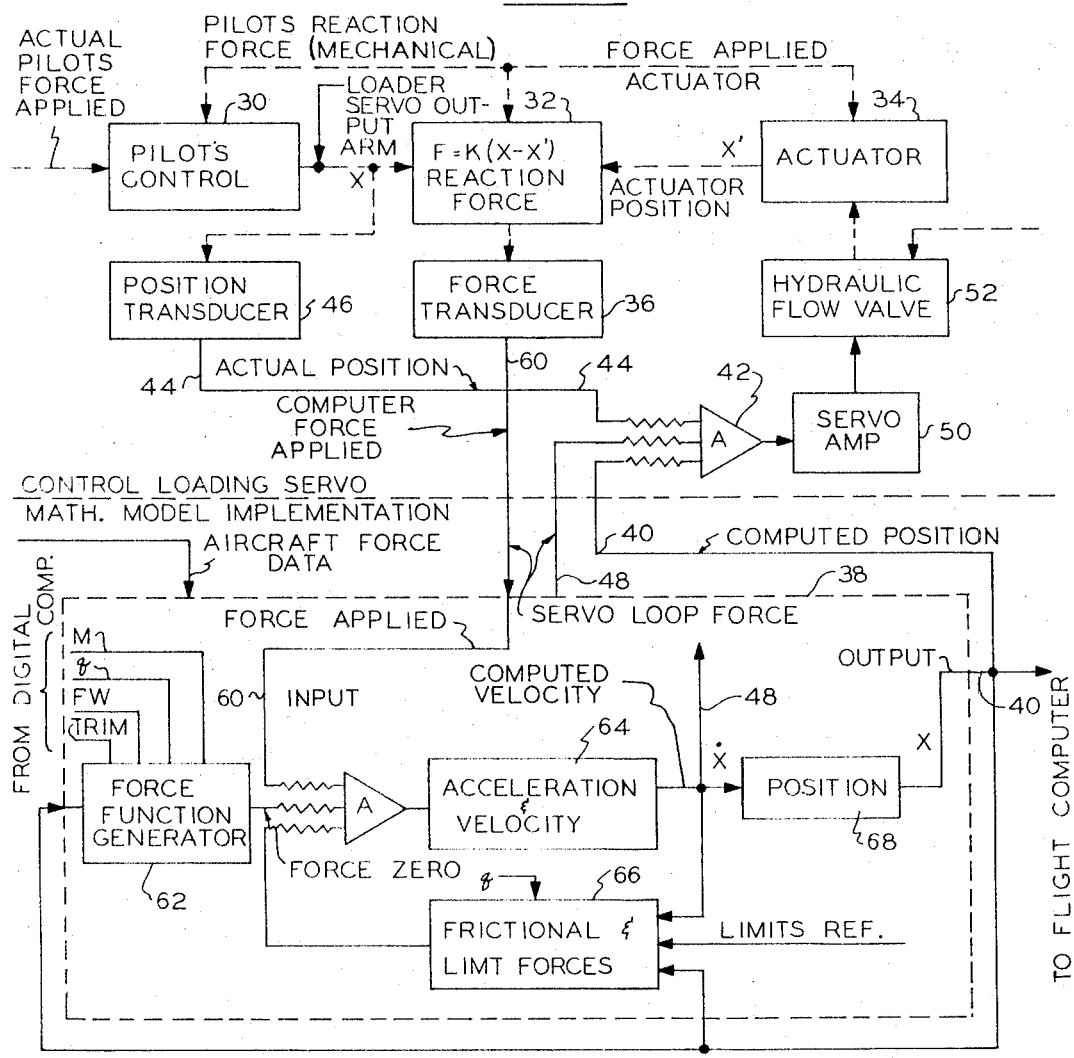
FIG. 2 is a block diagram of the flight simulator control loading system of the invention.
FIG. 3 is a further block diagram of a portion of the system shown in FIG. 2.

Referring again now to the drawings, FIG. 3 illustrates one embodiment of the previously mentioned analog model, forming the second feedback loop, and designated generally in this figure by the reference numeral 38. The model is also referred to in this figure as "math model implemention" and is shown in its operational connection to the physical servo, or first feedback loop, shown in block diagram form in FIG. 2. As there shown, a first analog signal is applied to a summing amplifier 61. This first analog signal corresponds to the actual student pilot's force applied to control 30, the mechanical force differential being converted to the electrical analog thereof by means of transducer 36. Another input to amplifier 61 is provided by a force function generator 62, which supplies computed $F_{aero}$, part of the "required force" potential, while a third input is a potential simulating frictional and limit portions of the "required force." The computer $F_{aero}$ potential is derived from such parameters, calculated by the digital computer associated with the aircraft simulator, as dynamic pressure $q$, Mach number M, wing flaps position $Fw$, trim, etc., as well as the computed control position by means which will be better understood as the description proceeds. The final input to amplifier 61 is responsive to computed limit references and frictional forces, as well as a coefficient of the dynamic pressure by another summing amplifier indicated generally as 66. These forces added to the calculated $F_{aero}$ in the amplifier make up the total "Required Force" potential. The output of amplifier 61 which is proportional to the net sum of all forces on the control, by Newton's law, is also proportional to the acceleration of the control and is applied to a first integrator 64 to develop a computed velocity signal. Applying the velocity signal to a further integrator 68 derives the computed control position signal. As indicated in FIG. 3, the computed aircraft force data delivered to aero force generator 38 are supplied by an associated digital computer, and the computed control position information is fed back to the digital computer. It will be understood that the particular flight variables whose values are supplied to the system are given by way of example only and will be governed entirely by considerations of the system being simulated. Appropriate signals representing other forces, both variable and constant, may be added to the system in accordance with conventional practice to simulate the effects of centering spring force, auto pilot force, compensation for stretch in the physical linkage, and many other effects. Since the actual digital computer forms no part of the present invention, it will not be further described herein, reference being made to copending application Ser. No. 261,248 filed Feb. 21, 1963, on behalf of John M. Hunt, now U.S. Patent No. 3,363,331 issued Jan. 16, 1968, and assigned to the assignee of this invention. As there disclosed, a digital computer, primarily adapted for flight simulator operations is provided, which accepts a plurality of analog signals, converts them into corresponding digital signals, logically operates upon them, and then converts the computed digital results again into analog form. Thus, as viewed through the input-output system, the digital computer of the prior invention in most aspects appears similar to a large scale analog computer, accepting analog inputs and furnishing analog outputs, and is contemplated for use with the present invention, although other and different computers may be substituted therefor, if desired, both digital and analog, as will be understood by those skilled in the art. Further, such a computer also provides the necessary outputs for all of the simulated indicators and conditions of the simulated aircraft, of which this control loading system forms a part.

It is important to note that any change in control position should be reflected immediately in the "required force" potential applied to servo amplifier 50 without any delay. If this potential only reflects the change in control position after a delay, such as a delay required until new quantities can be computed by the digital computer, it will be seen that a considerable error signal could exist within the control loading system until such computations were completed, and that a wholly unrealistic force would be applied to the control during this delay time. For this reason, an independent analog force loop is provided, external to the digital computer as shown in FIG. 3, which operates to *immediately* apply to control 30 an analog "required force" potential of the required phase, although not necessarily of the required magnitude, and thereafter correcting only the magnitude of the "required force" potential in accordance with the computed digital data which is *slowly changing* due to the inherent characteristics of the aircraft. It thus should be understood that, while the required frequency response for realistic simulation may be of the order of 3 c.p.s. or less for most of the simulated indications and conditions, considerably higher frequency response is necessary for realistic control loading. Therefore, while the step changes occurring in the analog output voltages provided by the digital computer either may be unnoticeable to the student pilot, or if noticeable, may be readily filtered out, such step changes in the control loading system would be obviously noticeable to the student pilot since they would result in rapid movements of control 30, and such step changes may not readily be filtered out without either decreasing the control loading frequency response below an acceptable minimum level, or rendering the control loading loop unstable. Thus the circuitry illustrated in FIG. 3 operates *immediately*, and is wholly external to the digital computer, to determine the phase and approximate magnitude of the "required force" signal, in order that the "required force" potential will *immediately* respond to changes in the position of control 30.

Figure 4:
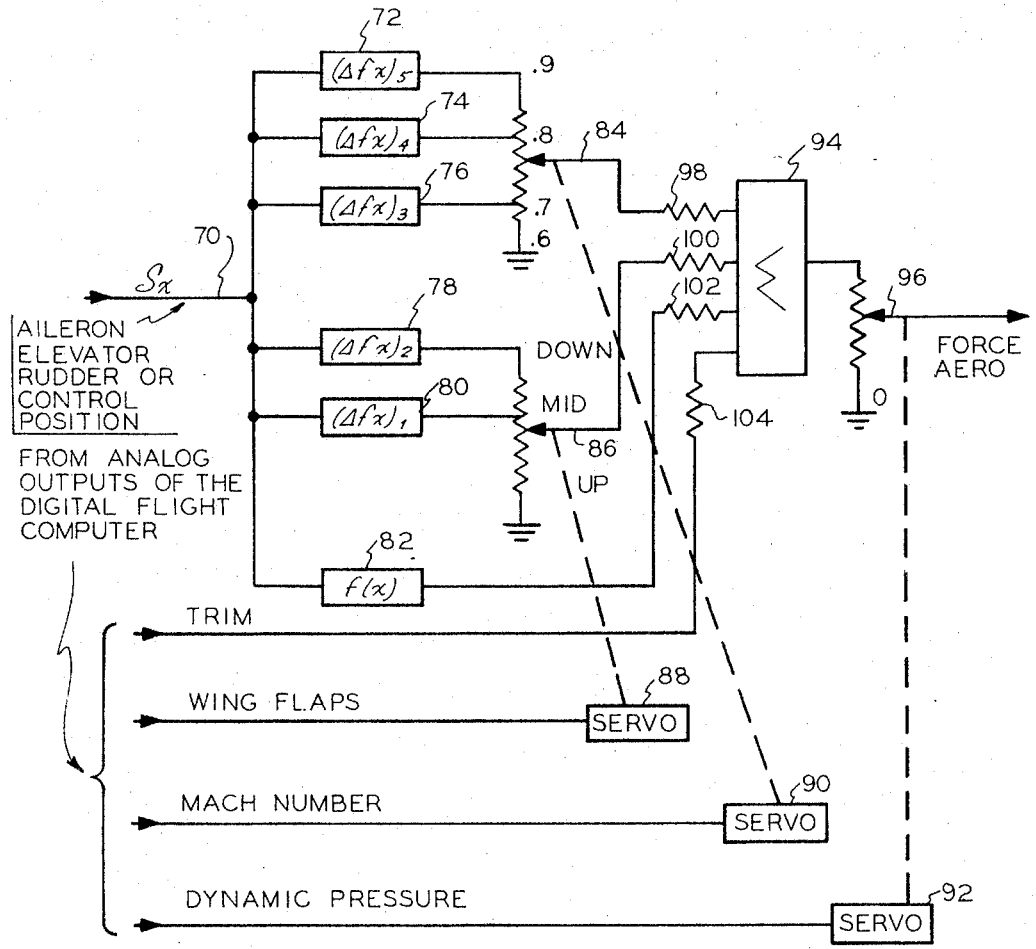
FIG. 4 is an electrical schematic diagram of the force function generator indicated in FIG. 3.

FIG. 4 illustrated one embodiment of force function generator 62. As there shown, the force aero function is generated by summing a plurality of analog voltages, each of which represents a component function of the hinge moment coefficient. The basic term $f(x)$ of the hinge moment coefficient is represented by the analog output voltage from an adjustable device 82 which may be a potentiometer, and this voltage is applied to a summing amplifier 94 through a scaling resistor 102. Another term of the hinge moment coefficient is provided by interpolating, by means of a servo-driven potentiometer 84, between a plurality of analog function voltages applied to potentiometer 84, and this term is also applied to summing amplifier 94 via scaling resistor 98. The wiper arm of interpolating potentiometer 84 is positioned by a Mach servo 90, which is a conventional DC position servo connected to follow the analog voltage representing the Mach number of the simulated flight provided by the digital computer. Because of the inertia of the aircraft, it will be appreciated that the Mach number is a slowly changing variable, so that the steps in the computed Mach number analog voltage are relatively small. The function voltages applied to excite interpolating potentiometer 84 are provided by devices 72, 74 and 76, each of which may again be an adjustable potentiometer, and each of which derives a separate and different function voltage. The wiper arms of potentiometers 72, 74 and 76 all are mechanically connected by means (not shown) to be positioned in accordance with simulator control position, and the windings of these potentiometers, which may be shorted and/or tapped in diverse ways, are excited by constant potentials from a conventional power supply.

A further term of the hinge moment coefficient is derived in similar manner by means of a servo driven tapped potentiometer 86, which interpolates between two function voltages which may be functions of aileron, elevator, rudder, or control position of the simulated aircraft as modified by potentiometers 78 and 80. It will be apparent to those skilled in the art that diode function generators may be used in lieu of potentiometers 78 and 80, as well as potentiometers 72, 74 and 76, without departing from this aspect of the present invention. Interpolating potentiometer 86 is driven by a wing flaps servo 88, another conventional analog simulator position servo, with the input signal to servo 88 comprising a computed wing flaps position analog voltage from the digital computer. This computed wing flaps position analog voltage is also a relatively slowly changing quantity in an aircraft, so that the steps in the analog voltage applied to servo 88 are small. Further, the steps occurring in the Mach number and wing flaps position voltages applied to servos 90 and 88 are in part filtered out by the inherent inertia of these mechanisms, so that no appreciable jumps or steps occur in the two hinge moment coefficient component voltages applied to summing amplifier 94 through scaling resistors 98 and 100.

A voltage representing yet another component of hinge moment coefficient, i.e., that component due to elevator trim control position, is provided in analog form from the digital computer and applied to summing amplifier 94 via scaling resistor 104. Inasmuch as this is ordinarily a small component of total hinge moment coefficient, any steps in the analog output voltage due to the computation repetition rate of the digital computer are small and do no cause large steps in either the total hinge moment coefficient or in the ultimate aerodynamic "required force" potential. These components of hinge moment coefficient are summed by summing amplifier 94 and applied to excite the windings of a potentiometer 96, the wiper arm of which is positioned by a further DC analog position servo 92 in accordance with the instantaneous dynamic pressure of simulated flight, another relatively slowly changing quantity, so that the steps in the analog dynamic pressure voltage supplied by the digital computer to adjust the position of servo 92 are small. As should now be evident from the description and equations above, force function generator 62 is effective to multiply the total hinge moment coefficient by the computed simulated dynamic pressure to provide the aerodynamic part of "required force" potential or force aero. It should further be understood that the circuitry shown in FIG. 4 is by way of example only, the specific circuitry chosen being determined by the aircraft to be simulated.

It is important to note that the flight simulator control loading system of the invention implements of servo force loop rather than a servo position loop as provided by the prior art thereby providing excellent stability of the control loading servo, since the simulated inertia introduced into the servo force loop can easily be maintained greater than the minimum value needed throughout the remaining portions of the system. Additionally, this feature provides excellent ability to return the control to a trim condition, which has not been attainable in the systems of the prior art as a result of the drift introduced directly into the flight system, and the hysteresis loop which exists in the hydraulic control valve. Further, high loop gains may be utilized in solving preload centering spring conditions resulting in greater ability to return the computed control position to neutral. Although the control position may continue to drift as always, this drift is not introduced into the flight system. The use of a servo force loop rather than a servo position loop also exhibits excellent ability to meet autopilot stability requirements. In previous simulators, the simulated autopilot could not "fly" the flight computer without the position servo being included in the loop. This resulted in makeshift circuitry being utilized to drive the position servo, while the autopilot bypassed the servo completely into the flight system. However, the frequency response of the present system may be readily determined by simple loop gain changes which are accompanied by the proper lead networks, thereby easily solving the autopilot transfer functions. It should also be understood that the total inertia felt by the student pilot is equal to the mechanical inertia in the actual control (between the pilot and the force transducer), plus the simulated inertia introduced in the system and manifested by reaction force feedback. This latter inertia may be scaled upward or downward, if desired, by employing a linkage reduction between the force transducer and the position transducer of the control loading servo.

While the invention has been generally illustrated utilizing DC electrical analog computation, those skilled in the art will recognize that AC computation may be substituted. Also, mechanical equivalents may be substituted for many of the electrical computing means shown without departing from the invention. The operational amplifiers, computing servo mechanisms, potentiometers and like apparatus all may be of the type presently utilized in the flight trainer industry. Although simple lag networks may be conveniently utilized to provide transfer functions simulating operation of various aircraft equipment, other transfer networks, both active and passive, may be utilized to simulate operation of aircraft equipment having more complex transfer functions within the scope of the present state of the art. Circuits for simulating the operation of a wide variety of apparatus pertinent to implementation of many details of flight trainer operation are shown in "A Palimpsest on the Electronic Art," published by Geo. A. Philbrick Researches, Inc., Boston, Mass., 1955, as well as numerous other places in the literature.

What has been described is an improved flight simulator control loading system which imparts realistic forces to controls of a simulated aircraft, missile, or other device, adaptable for use with a digital computer, wherein the frequency response of the control loading system is maintained greater than the frequency response capability of the digital computer employed.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. In a grounded flight trainer having a flight control member arranged for movement in response to physical control forces exerted by a student pilot, a loading system for applying to said control member during a simulated flight reaction forces realistically simulating those which would be applied during an actual flight to the corresponding control member of an actual aircraft of the type represented by said trainer, said loading system comprising, in combination:
   (a) transducer means for generating a first electrical signal as a function of the actual forces applied to said control member;
   (b) a first feedback loop including physical servomechanism arranged to apply said reaction forces to said control member;
   (c) computing means including an electrical implementation of pertinent physical characteristics of said control member and adapted to compute, in response to said first electrical signal and further signals representing outside variables affecting said reaction forces, the velocity and position of said control member;
   (d) a second feedback loop including said computing means and arranged to apply as an input thereto said computed position output thereof; and
   (e) means for operating said servomechanism to apply said reaction forces as a function of said computed velocity and position, whereby said first electrical signal representing the actual forces applied to said control member is operated on in said second feedback loop prior to having any effect on said servomechanism in said first feedback loop.

2. The invention according to claim 1 wherein a second electrical signal representative of the actual position of said control member is supplied directly to affect operation of said servomechanism, in addition to said computed velocity and position signals.

3. The invention according to claim 2 wherein said further signals are supplied to a force function generator which linearly interpolates said further signals to provide a signal representing the aerodynamic force applied to said control.

4. The invention according to claim 3 wherein said pertinent physical characteristics include frictional forces and physical limits of movement associated with said control member.

5. In a grounded flight trainer having at least one flight control member arranged to receive physical control forces exerted by a student pilot, a loading system for applying to said control member reaction forces which accurately simulate the reaction forces which would be applied to the corresponding control member in an actual aircraft of the type represented by said trainer during flight thereof, said loading system comprising, in combination:

(a) force transducer means for generating a first electrical signal as a function of the resultant of said control forces and said reaction forces;
 (b) function generator means for generating a second electrical signal as a function of computed values of variables affecting said reaction forces during operation of said trainer to simulate said flight;
 (c) means for generating a third electrical signal as a function of electrically implemented frictional forces and physical limits associated with movement of said control member;
 (d) first integrating means having as an input said first, second and third electrical signals and as an output the computed velocity of said control member;
 (e) second integrating means having as an input the output of said first integrating means and as an output the computed position of said control member;
 (f) means for applying the output of said second integrator means as one of the inputs to said force function generator means;
 (g) position transducer means for generating an electrical signal output as a function of the actual position of said control member; and
 (h) servo means constructed and arranged to apply said reaction forces to said control member in response to a signal representing the summed outputs of said first and second integrating means and said position transducer.

6. The invention according to claim 5 wherein said force function generator means comprises a linear interpolator.

7. The invention according to claim 6 wherein signals representing said variables affecting said reaction forces are supplied to said linear interpolator from an external computer.

References Cited

UNITED STATES PATENTS

| | | | |
|---|---|---|---|
| 3,007,258 | 11/1961 | Hemstreet et al. | 35—12 |
| 3,063,160 | 11/1962 | Hemstreet | 35—12 |
| 3,220,121 | 11/1965 | Cutler | 35—12 |
| 3,258,517 | 6/1966 | Longley | 35—10.2 |

MALCOLM A. MORRISON, Primary Examiner

R. W. WEIG, Assistant Examiner

U.S. Cl. X.R.

35—12